US010189738B2

(12) United States Patent
Richardson, III

(10) Patent No.: US 10,189,738 B2
(45) Date of Patent: Jan. 29, 2019

(54) BUSHING WITH RIBBED TIP PLATE

(71) Applicant: JOHNS MANVILLE, Denver, CO (US)

(72) Inventor: Morris L Richardson, III, Tucson, AZ (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 15/604,939

(22) Filed: May 25, 2017

(65) Prior Publication Data

US 2017/0260082 A1 Sep. 14, 2017

Related U.S. Application Data

(63) Continuation of application No. 14/572,835, filed on Dec. 17, 2014, now Pat. No. 9,682,884.

(51) Int. Cl.
C03B 37/083 (2006.01)
C03B 37/08 (2006.01)
C03B 37/02 (2006.01)

(52) U.S. Cl.
CPC ........ C03B 37/083 (2013.01); C03B 37/0203 (2013.01); C03B 37/08 (2013.01)

(58) Field of Classification Search
CPC ............................. C03B 37/08; C03B 37/083
USPC ........................................................ 65/495
See application file for complete search history.

(56) References Cited

U.S. PATENT DOCUMENTS

| 3,628,930 | A | 12/1971 | Harris |
| 3,979,195 | A | 9/1976 | Strickland |
| 5,928,402 | A | 7/1999 | Mirth |
| 6,453,702 | B1 | 9/2002 | Hanna et al. |
| 6,701,754 | B2 * | 3/2004 | Sullivan .................. C03B 5/207 65/495 |
| 2003/0145631 | A1 | 8/2003 | Sullivan et al. |
| 2006/0201207 | A1 | 9/2006 | Renaudin et al. |
| 2011/0146351 | A1 * | 6/2011 | Harms .................. C03B 37/081 65/495 |

FOREIGN PATENT DOCUMENTS

| EP | 2 676 937 A1 | 12/2013 | |
| JP | 60103047 A | 6/1985 | |
| JP | 05279072 A | * 10/1993 | ......... C03B 37/0209 |
| WO | 99/06329 A1 | 2/1999 | |

* cited by examiner

Primary Examiner — Erin Snelting
(74) Attorney, Agent, or Firm — Robert D. Touslee

(57) ABSTRACT

A bushing system may include a bushing that is configured to receive a molten material. The bushing may include a plate defining a first plurality of apertures through which the molten material flows. The plate may include a longitudinal axis, as well as a first side wall and a second side wall disposed on a side of the plate opposite the first side wall. The first side wall and the second side wall may extend at an upward angle from the plate. The plate may also include a plurality of ribs extending along at least a portion of the plate. The bushing system may also include a tip plate coupleable with the bushing. The tip plate may be configured to receive the molten material from the bushing and may define a second plurality of apertures through which the molten material flows to form fibers.

14 Claims, 11 Drawing Sheets

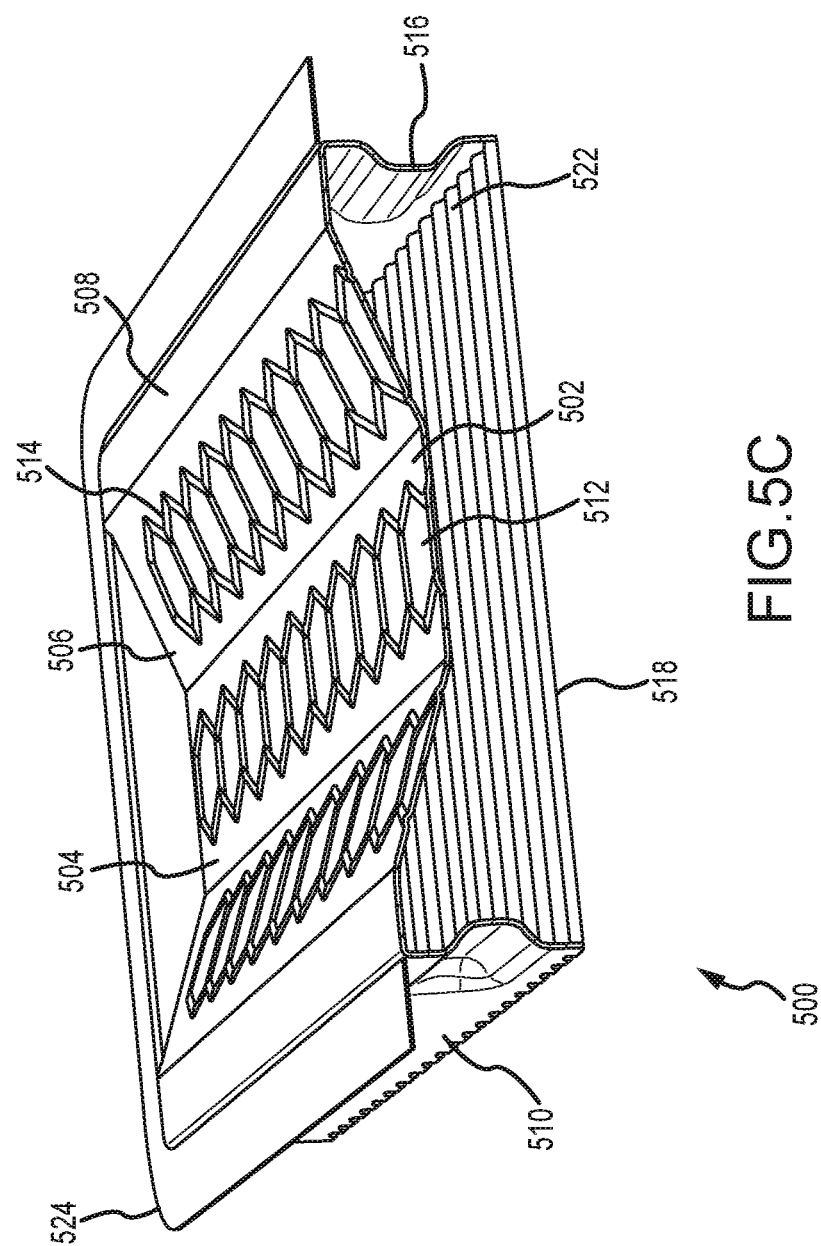

BUSHING WITH RIBBED TIP PLATE

CROSS-REFERENCE TO RELATED APPLICATIONS

This application is a continuation of pending U.S. patent application Ser. No. 14/572,835 filed Dec. 17, 2014, the entire disclosure of which is hereby incorporated by reference herein for all purposes.

BACKGROUND OF THE INVENTION

Bushings have long been used in the manufacture of fibers, such as glass fibers. The production of glass fibers requires the bushings to be exposed to high temperatures, oftentimes over 2000° F. Exposure to such high temperatures may lead to creep strain in the bushing. Due to the tight tolerances required in glass fibers even a small amount of creep may render a bushing unusable. Conventional bushing designs typically combat creep by increasing the thickness of bushing components. However, alloys containing significant amounts of precious metals are used in the manufacture of such bushings to provide resistance to the creep strain. Oftentimes several hundred troy ounces of precious metals are used, making the failure of a bushing a significant cost, even if the precious metals are recycled. Additionally, conventional bushings may require significant man hours to construct, such as by including many welds. As a result, conventional bushings are a significant cost in the production of glass fibers.

BRIEF SUMMARY OF THE INVENTION

Embodiments of the invention provide bushing systems that prevent creep and reduce the amount of precious metal alloy necessary to fiberize the bushing systems. The reduction of creep enables the bushing system to be usable for longer periods of time and more reliable in producing fibers of consistent sizes. Due to the significant expense of the alloys used to fabricate the bushing systems, the reduction of alloy results in large savings in material costs. Additionally, the bushing systems described herein require less time to manufacture, resulting in lower worker costs.

In one aspect, a bushing system for producing fibers from a molten material is provided. The bushing system may include a bushing that is configured to receive a molten material. The bushing may include a plate defining a first plurality of apertures through which the molten material flows. The plate may include a longitudinal axis, as well as a first side wall and a second side wall disposed on a side of the plate opposite the first side wall. The first side wall and the second side wall may extend at an upward angle from the plate. The plate may also include a plurality of ribs extending along at least a portion of the plate. The bushing system may also include a tip plate coupleable with the bushing. The tip plate may be configured to receive the molten material from the bushing and may define a second plurality of apertures through which the molten material flows to form fibers.

In another aspect, a bushing system for producing fibers from a molten material is provided. The bushing system may include a bushing that is configured to receive a molten material. The bushing may include a plate defining a first plurality of apertures through which the molten material flows. The plate may include a longitudinal axis, as well as a first side wall and a second side wall disposed on a side of the plate opposite the first side wall. The first side wall and the second side wall may extend at an upward angle from the plate. The plate may also include a first plurality of ribs extending along at least a portion of the plate. The bushing system may also include a tip plate coupleable with the bushing such that the tip plate is spaced apart from the plate. The tip plate may be configured to receive the molten material from the bushing and may define a second plurality of apertures through which the molten material flows to form fibers. The tip plate may also include a second plurality of ribs extending along at least a portion of the tip plate.

In yet another aspect, a method for producing fibers from a molten material may be provided. The method may include providing a bushing system having a bushing that is configured to receive a molten material. The bushing may have a plate defining a first plurality of apertures through which the molten material flows. The plate may include a longitudinal axis, as well as a first side wall and a second side wall disposed on a side of the plate opposite the first side wall. The first side wall and the second side wall may extend at an upward angle from the plate. The plate may further include a plurality of ribs extending along at least a portion of the plate. The bushing system may also include a tip plate coupleable with the bushing. The tip plate may be configured to receive the molten material from the bushing and may define a second plurality of apertures through which the molten material flows to form fibers. The method may also include introducing the molten material to the bushing. Heat may be applied to the bushing such that the molten material flows through the first plurality of apertures of the bushing onto the tip plate where the molten material subsequently flows through the second plurality of apertures of the tip plate to form fibers.

BRIEF DESCRIPTION OF THE DRAWINGS

FIG. 5C depicts a cross section of the bushing system of FIG. 5A according to embodiments.

DETAILED DESCRIPTION OF THE INVENTION

Embodiments of the invention provide bushing systems that minimize creep and reduce the amount of precious metal alloy necessary to produce the bushing systems. The bushing systems include a bushing and a tip plate. The bushing and/or the tip plate may include one or more ribs extending along a surface of the bushing and/or the tip plate. The ribs enable thinner designs of bushing systems such that lower amounts of precious metals are necessary. The ribs provide increased rigidity to further minimize creep strain. As a result, the bushing systems described herein provide more cost effective solutions for producing glass fibers than conventional bushings. While discussed largely in systems for producing glass fibers, the bushings systems described herein may be used to produce fibers from other molten materials.

In one aspect, a bushing system for producing fibers from a molten material is provided. The bushing system may include a bushing that is configured to receive a molten material, such as molten glass for producing glass fibers. The bushing plate may define a number of apertures through which the molten material flows. The plate may also include a plurality of ribs extending along at least a portion of the plate. The bushing system may also include a tip plate coupleable with the bushing. The tip plate may be configured to receive the molten material from the bushing. In some embodiments, the tip plate may be a generally flat piece of metal. The tip plate may define a second plurality of apertures through which the molten material flows to form fibers. In some embodiments, the apertures include tips to help consistently form fibers of a desired size.

Figure 1A:
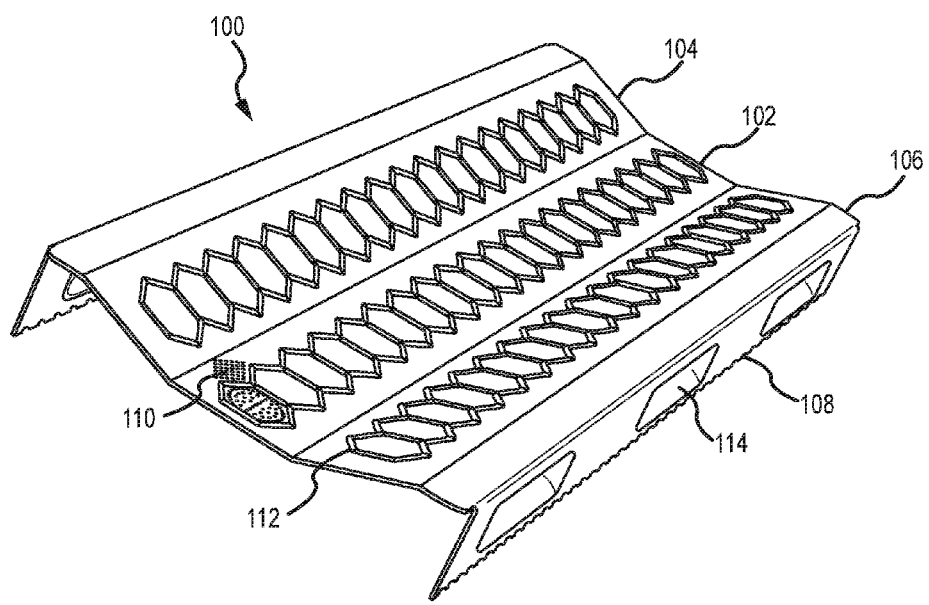
FIG. 1A depicts an isometric view of a bushing plate according to embodiments.
Figure 1B:
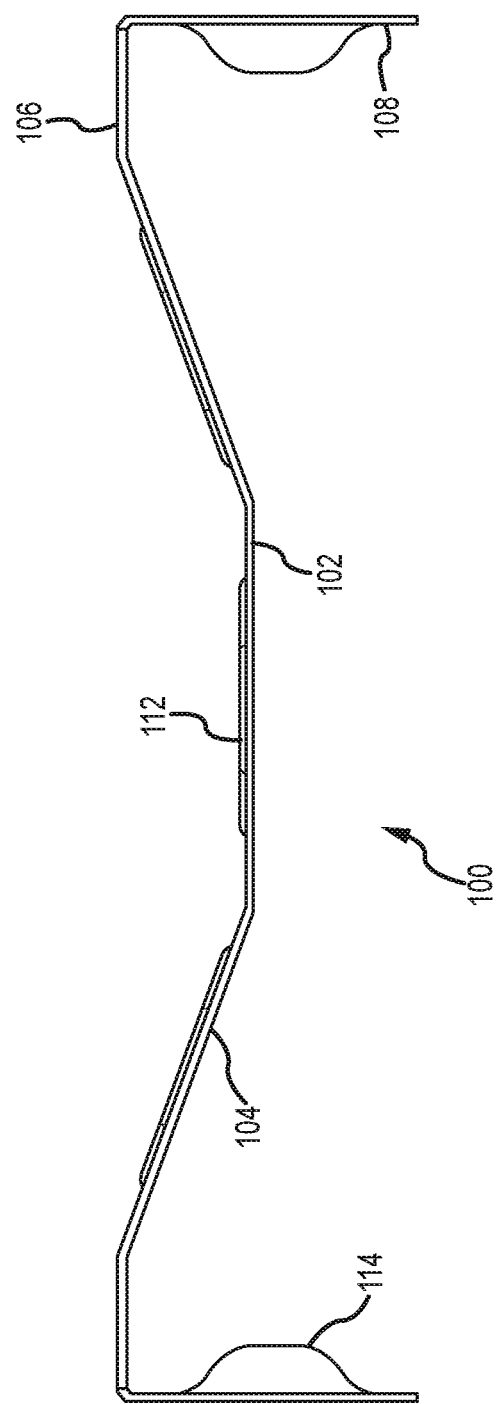
FIG. 1B depicts a side view of the bushing plate of FIG. 1A according to embodiments.

Referring to FIGS. 1A and 1B, various views of a bushing 100 are shown. FIG. 1A shows an isometric view of bushing 100 having a flat plate 102 and two side walls 104 extending upward from the plate 102 and disposed on opposite sides of the plate 102 from one another such that the plate 102 forms a center portion between the two side walls 104. In some embodiments, the side walls 104 extend upward at an angle between 0° and 90° such that a top edge of each of the side walls 104 is higher than a bottom edge of the sides walls 104 and the plate 102 as seen in FIG. 1B. Oftentimes, the side walls will extend at an angle between about 20° and 40°. A flat wing 106 may extend from each of the side walls 104. In some embodiments, a side rail may extend downward from each of the wings 106 or the side walls 104. The side walls 104 may extend along a longitudinal axis of the plate 102.

Referring back to FIG. 1A, the bushing 100 may define a plurality of apertures 110 through which molten material may flow. The bushing 100 may include any number of apertures 110, and apertures 110 may be positioned in any arrangement. For example, the bushing 100 may include hundreds, thousands, or even tens of thousands of apertures 110. The diameters of the apertures 110 on bushing 100 may between about 0.070 inches and 0.050 inches. In some embodiments, the diameter of apertures 110 may be larger than the final fiber diameter. The fiber diameters may be further reduced by an attenuation process after the molten material has passed through the apertures 110 and any apertures and/or tips of a tip plate positioned below the bushing 100. An aperture density and/or size of the bushing 100 may vary in different sections of the bushing 100 to account for different flow rates in portions of the bushing 100 experiencing a non-uniform temperature distribution. As one example, in a high flow rate portion of bushing 100, the aperture density may be between about 80 and 120 apertures/in$^2$, while in a low flow rate portion, the aperture density may be between about 20 and 60 apertures/in$^2$. The distance between apertures 110 may be selected such that the bushing material defining the apertures 110 maintains sufficient stiffness to resist creep associated with exposure to the high temperatures. In some embodiments, the apertures 110 may be arranged in rows, staggered double rows, circular patterns, and/or any other random or patterned arrangement. The apertures 110 may be arranged based on the placement of any ribs as described below. The apertures 110 are configured to receive a molten material to form fibers. In some embodiments, the molten material is glass. While almost any glass can be made into fiber, the most commonly used is well known E-type glass, which is a lime-alumina borosilicate. Sodium boro-silicate glasses may also be used to make fiber. The bushings described herein are usable with any molten material, including any organic materials and any glass compositions that can be made into a fiber using a fiberizing bushing. In some embodiments, the glass may be melted and conditioned to remove most of the entrained gasses and to reduce the temperature below that used to melt the glass. The molten glass may be received in a bushing. In some embodiments, tips, such as those described below, may be used to further control the flow rate and final size of the fibers produced by the bushing 100.

The bushing 100 may also include a plurality of ribs 112 extending along at least a portion of the plate 102. The ribs 112 may have an arcuate profile and protrude above or below the surface of the bushing 100. The ribs 112 may be configured to provide structural support to the bushing 100 while reducing the amount of material needed to fabricate the bushing 100. This results in significantly lower costs while producing a bushing design that effectively resists creep strain associated with exposure to very high temperatures. Additionally, bushings 100 having ribs 112 may not need to include support tubes found in conventional bushings. As a result, less material is needed and fabrication costs can be reduced with fewer man hours being needed due to fewer steps such as welding being required. For example, bushing 100 having ribs 112 may be between 0.040 inches and 0.055 inches thick while conventional bushings require a range of thicknesses between 0.015 inches and 0.040 inches composited together by means of material fusion. The ribs 112 may be linear and extend along all or a portion of a width and/or length of the bushing plate 102, the side walls, 104, and/or the wings 106. In some embodiments, the ribs 112 may be positioned along the bushing 100 at an angle relative to the longitudinal axis. In other embodiments, the ribs 112 may be in a hexagonal or honeycomb arrangement as shown in FIG. 1A. The ribs 112 may also be nonlinear, such as in circular or otherwise arcuate shapes. In some embodiments, ribs 112 may span multiple surfaces of the bushing plate 102. Each surface of the bushing 100 may have ribs 112 of different shapes, patterns, and/or sizes. In some embodiments, some or all of the ribs 112 on the bushing may be identical, while in other embodiments multiple sizes, shapes, and/or patterns of ribs 112 may be utilized. In some embodiments, some or all of the ribs 112 may be lined with a ceramic material as a design redundancy to accommodate occasional excessive operational conditions which may exceed the creep resistance parameters of the ribs 112 without increasing the geometrical parameters (i.e. material thickness) of the bushing design. By using ceramic material to provide additional creep resistance, the cost of materials used to fabricate the bushing 100 may be minimized. In other embodiments, a ceramic rod (not shown) may be positioned within some or all of the ribs 112. In some embodiments, at least some of the ribs 112 extend all the way to an edge of the bushing plate 102. In some embodiments, apertures 110 may be positioned within and around ribs 112. For example, in the honeycomb configuration of ribs 112 shown here, apertures 110 may be positioned on an inside and/or on an outside of the honeycomb shapes.

In some embodiments, the side rails 108 may include one or more embossed portions 114 extending along a length of the side rail 108. The embossed portions 114 may be rectangular, circular, and/or other shapes. The embossed portions 114 may protrude into an interior portion of the bushing 100 and may provide additional structural support and creep resistance.

Figure 2A:
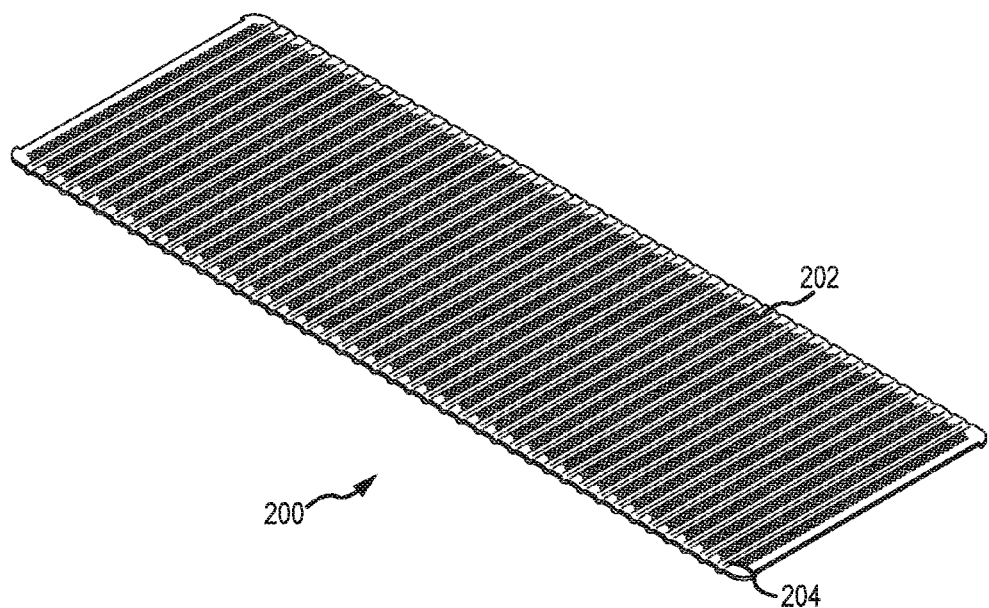
FIG. 2A depicts an isometric view of a tip plate according to embodiments.
Figure 2B:
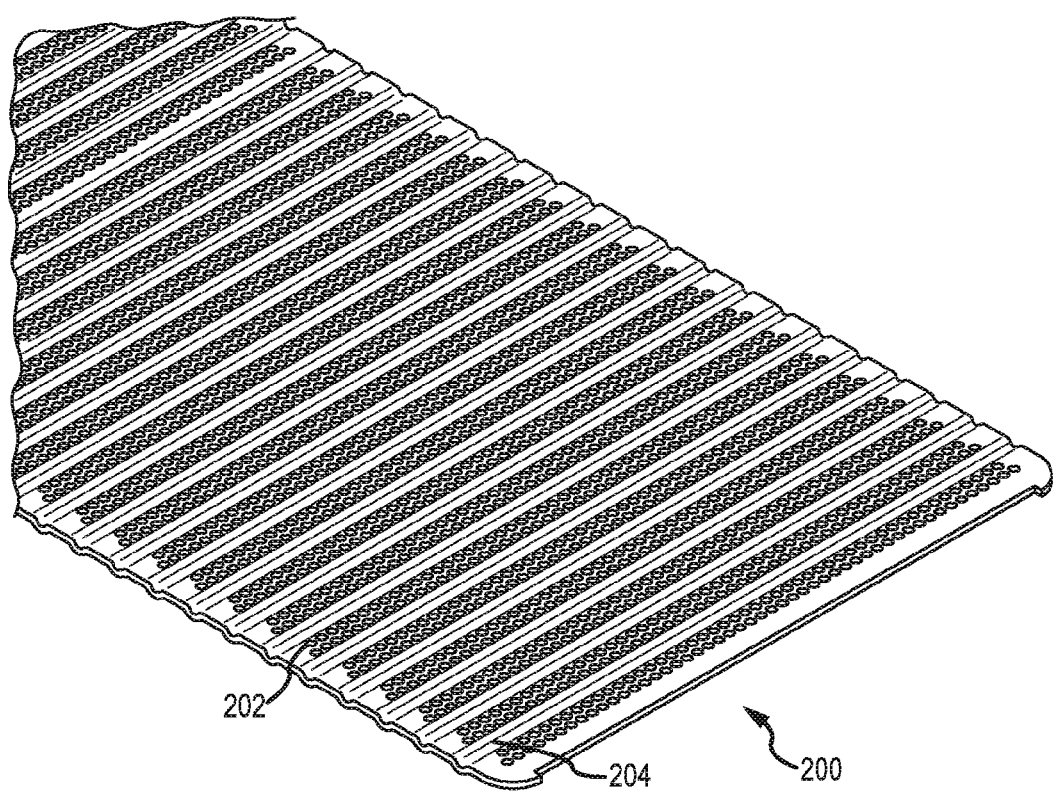
FIG. 2B depicts a magnified view of the tip plate of FIG. 2A according to embodiments.

FIGS. 2A and 2B illustrate one embodiment of a tip plate 200. FIG. 2A shows tip plate 200 may be a generally flat metallic plate that may be configured to receive molten material from a bushing, such as bushing 100 described above. The tip plate 200 may be sized to be positioned underneath the bushing. The tip plate 200 may define a plurality of apertures 202 through which the molten material received from the bushing flows to form fibers as seen in FIG. 2B. In some embodiments, the apertures 202 may house tips (not shown) to help consistently form fibers of a desired size. While shown here as sets of two rows of circular apertures 202, it will be appreciated that other configurations may be used. For example, a single row, or more than two rows of apertures 202 may extend along a surface of tip plate 200. Apertures 202 may be in nonlinear arrangements, such as circular or hexagonal patterns. In some embodiments, the apertures 202 may be sized and positioned to correspond with apertures from a bushing plate, such as the apertures 110 of bushing plate 100. In other embodiments, the apertures 202 of tip plate 200 may be sized, shaped, and/or arranged differently than apertures on a bushing plate.

In some embodiments, the tip plate 200 may also include ribs 204 extending along at least a portion of the tip plate 200. Ribs 204 may protrude above and/or below the tip plate 200 and provide structural integrity and increase the resistance of the tip plate 200 to creep strain when exposed to the mechanical loading and high temperatures of the molten material. In some embodiments, the ribs 204 may extend entirely to one or more edges of the tip plate 200, while in other embodiments, ribs 204 may terminate in a middle portion of the tip plate 200. While shown as running entirely along a width of tip plate 200, it will be appreciated that ribs 204 may extend along only a portion of the width and/or length of the tip plate 200. In some embodiments, the ribs 204 may extend along a longitudinal axis of the tip plate 200. As with bushing 100, ribs 204 may reduce the amount of material needed to fabricate tip plate 200 by increasing the stiffness of the tip plate 200. For example, tip plate 200 may be between about 0.040 inches and 0.050 inches thick while conventional bushing tip plates range from 0.060 inches to 0.070 inches.

Figure 3:
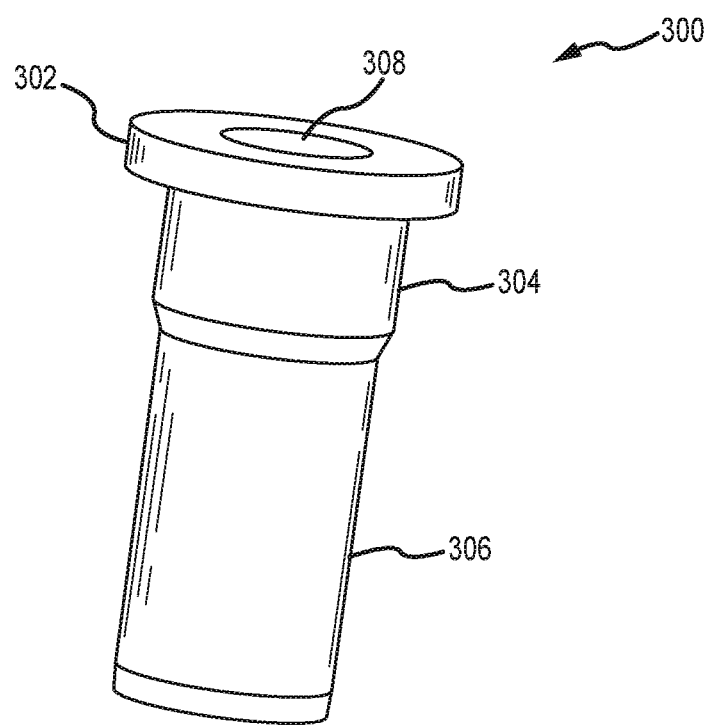
FIG. 3 depicts a tip according to embodiments.

FIG. 3 shows one embodiment of a tip 300 that acts as a nozzle to form fibers of a precise diameter. Tip 300 may be configured to fit within an aperture of a bushing plate or a tip plate, such as bushing plate 100 or tip plate 200. Tip 300 may include a top portion 302 that is configured to contact a top surface of the bushing or tip plate. The tip 300 may include a middle portion 304 that is configured to be received within an aperture of the bushing plate or tip plate. The middle portion 304 may have a diameter that is approximately the diameter of a corresponding aperture. Tip 300 may further include a lower portion 306 that is configured to produce a flow of molten material to form fibers below the surface of a bushing plate or tip plate. The lower portion 306 may extend below a bottom surface of a bushing plate or tip plate. The tip 300 also defines an aperture 308 that extends entirely through a length of the tip 300. Molten material passes through aperture 308 to form the fibers. In some embodiments, the tip 300 may be formed integral with the bushing plate or the tip plate, which in other embodiments the tip 300 may be a separate component that is insertable into an aperture of a tip plate or bushing plate. The tip 300 may then be welded or otherwise secured within the aperture.

Figure 4:
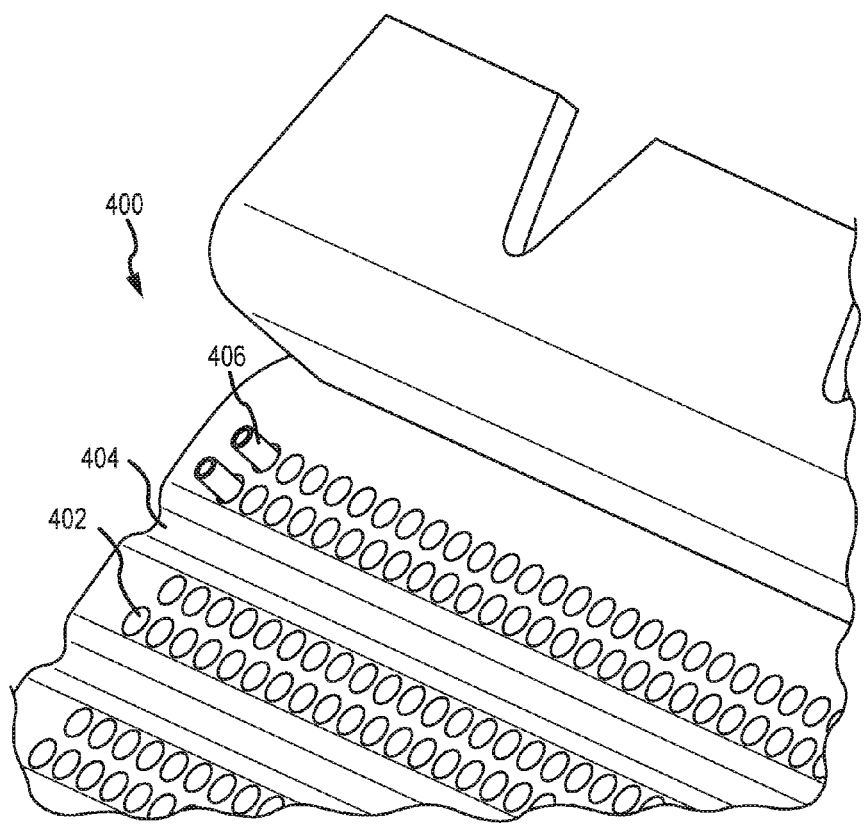
FIG. 4 depicts a tip plate having tips according to embodiments.

FIG. 4 shows a tip plate 400 having a tip 406 extending through an aperture 402. Tip plate 400 may be the same as tip plate 200 described above. Tip plate 400 may include one or more ribs 404. Tip 406 may be tip 300 as described above, and may be formed integral with, or separate from, tip plate 400. Molten material that contacts the tip plate 400 may be forced, drawn, or otherwise flow through tips 406 to form fibers.

Figure 5A:
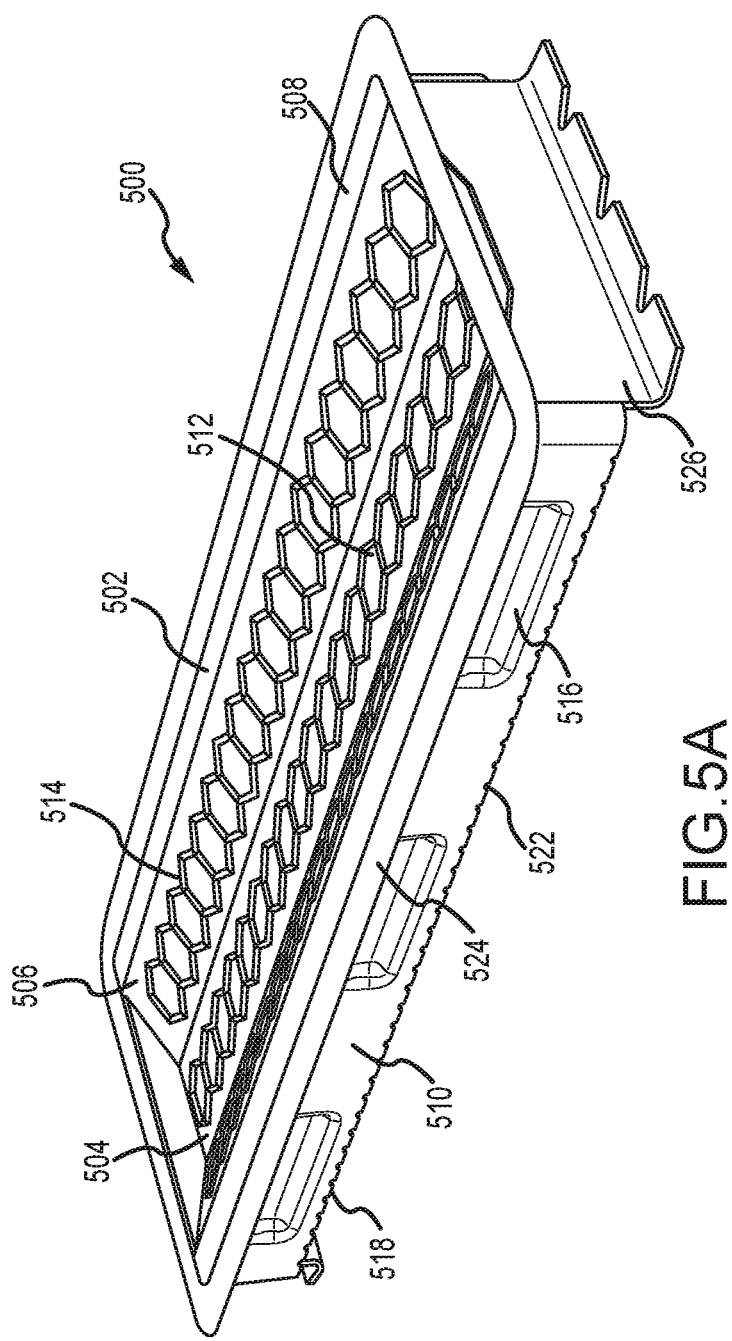
FIG. 5A depicts a top isometric view of a bushing system according to embodiments.
Figure 5B:
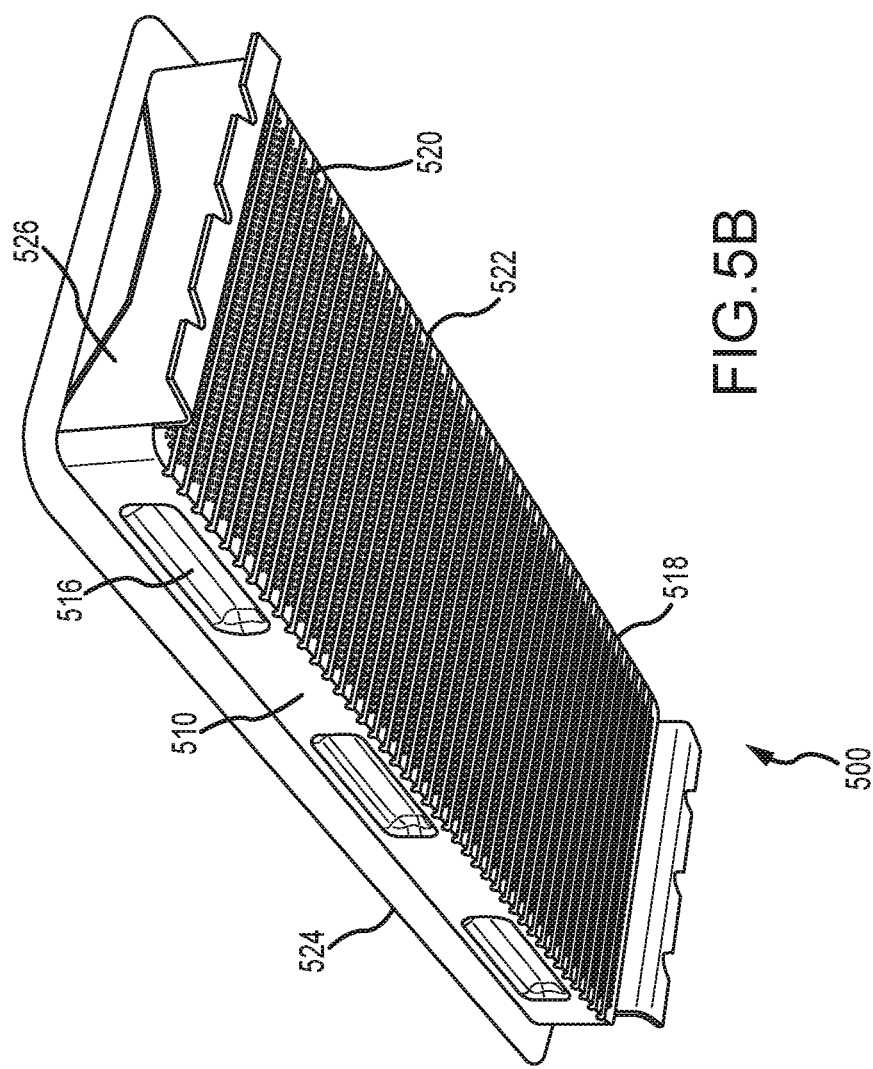
FIG. 5B depicts a bottom isometric view of the bushing system of FIG. 5A according to embodiments.

FIGS. 5A-5C show a bushing system 500 for forming fibers from a molten material according to one embodiment. As shown in FIG. 5A, bushing system 500 may include a bushing 502, similar to bushing 100 described herein. Bushing 502 includes a bushing plate 504 having side walls 506, wings 508, and side rails 510 extending from the bushing plate 504. In bushing 502, side walls 506 extend from bushing plate 504 at an angle of about 20°. The bushing 502 may include a plurality of apertures 512 and ribs 514, similar to apertures 110 and ribs 112 described above. Here, ribs 514 are arranged in honeycomb patterns along a length of bushing plate 504 and side walls 506. In some embodiments, ribs 514 may have different lengths, widths, and/or arrangements, and ribs 514 may be positioned on any combination of the bushing plate 504, side walls 506, wings 508, and side rails 510 to achieve desired creep resistance. While shown here with apertures 512 positioned within an interior of the honeycomb patterned ribs 514 on the bushing plate 504, it will be appreciated that apertures 512 may also be positioned outside the honeycomb patterned ribs 514, and may also be positioned on other surfaces of the bushing 502, such as side walls 506 and/or wings 508. The side rails 510 may include one or more embossed portions 516. Embossed portions 516 may protrude toward an interior of bushing 502, or may protrude outward. Embossed portions 516 may provide additional stiffness and creep resistance while reducing the amount of material needed to fabricate the bushing 502.

Bushing system 500 may also include a tip plate 518 as seen in the bottom view of FIG. 5B. Tip plate 518 may have the same features as tip plate 200 described above. Tip plate 518 may include a number of apertures 520 that extend through a thickness of the tip plate 518. In some embodiments, the area used for apertures 520 may be maximized in order to increase the efficiency of fiberization. In some embodiments, apertures 520 of tip plate 518 may correspond in size, shape, number, and/or arrangement to the apertures 512 of the bushing plate 504. In other embodiments, the apertures 520 may have different sizes, shapes, numbers, and/or arrangements from apertures 512 of bushing plate 504. In some embodiments, the In some embodiments, apertures 520 of tip plate 518 and/or apertures 512 of bushing plate 504 may include tips (not shown) to form fibers of desired sizes from molten material flowing therethrough. The tips may have similar features as tip 300 described herein.

Tip plate 518 may include a number of ribs 522 that may extend along all or part of a length and/or width of tip plate 518. While shown with ribs 522 extending along an entire width of tip plate 518, ribs 522 may extend along a length, or at an angle relative to the width and/or length of the tip plate 518. Ribs 522 may be linear or nonlinear and may be arranged in various configurations on the tip plate 518. The ribs 522 may correspond to sizes, shapes, and/or arrangements of ribs 514 of bushing plate 504.

Bushing system 500 may also include a sealing flange 524. Sealing flange 524 may be configured to couple with the wings 508 of bushing 502 and a source of molten material such that the molten material received in the bushing 502 does not leak out of the bushing 502. The bushing system 500 may also include a terminal end 526 that may couple with the bushing 502 and/or the tip plate 518. Terminal end 526 may be coupled with an electrical source (not shown) that may supply the terminal end 526 with current. The current may heat terminal end 526, as well as the rest of bushing system 500. While described having the above components, it will be appreciated that the bushing system 500 may be incorporated for use with fewer or additional components to fiberize a molten material.

In some embodiments, tip plate 518 may be positioned a distance below the bushing plate 504 such that the tip plate 518 and the bushing plate 504 are spaced apart, as seen in FIG. 5C. In some embodiments, the tip plate 518 may be spaced a distance of between about 0.080 inches and 0.020 inches below the bushing plate 504. The apertures 512 and 520 and/or ribs 514 and 522 may be formed using a drill, punch, computer numerical control (CNC) machine, or by other methods. In some embodiments, a process of cold forming is used to emboss (i.e. rib) the material (bushing 502 and/or tip plate 518) using geometry specific tooling design. The tooling must be form depth configurable tooling allowing for precision rib placement while not introducing damage to the part while forming rib 514 and/or 522 to resist creep. Depending on material size and constraints periodic stress relieving is required to insure an excessive amount of residual stress is not stored within the part because of the cold forming (i.e. rib forming) process. In some embodiments, components of the bushing system 500, including the bushing 502 and tip plate 518 may be made out of an alloy of platinum, rhodium, and/or iridium or other alloys that are highly resistant to creep strain at high temperatures. Oftentimes, noble metals, especially precious metals, have material properties that make them suitable for fabrication of the bushing system 500.

Bushing system 500 operates by receiving a material to fiberize within bushing 502. The material may be a molten material, such as in direct melt systems, or may be a pellet or other solid material that is melted within the bushing 502, such as in marble or indirect melt systems. Heat is applied to the bushing 502 and/or tip plate 518 by applying current to the terminal end 526 to heat the metallic structure of bushing system 500. The bushing system 500 is heated and maintained within a fiberizing range of the material to be fiberized, oftentimes near the upper limit of this range to ensure all of the material is melted and/or remains molten and at a consistent viscosity. In some embodiments, this may be well over 2000° F. In some embodiments, bushing system 500 may be insulation to improve efficiency, as well as to increase the uniformity of the heat distribution. As the bushing system 500 is heated, the material either remains melted, or when pellets are used, the pellets are melted. Molten material is drawn through apertures 512 of bushing 502 and onto tip plate 518. The bushing 502 may prevent contaminants, including refractory materials and unmelted debris, from entering the tip plate 518. The bushing 502 may condition and/or homogenize the molten material, such as by controlling the temperature, viscosity, and/or chemistry of the molten material to ensure consistent materials flow to the tip plate 518. In some embodiments, the molten material then passes through apertures 522 to form fiber streams. In other embodiments, the molten material flows through tips positioned within apertures 522 to form the fiber streams. The fiber streams may then be attenuated to form fibers having a desired diameter.

Figure 6:
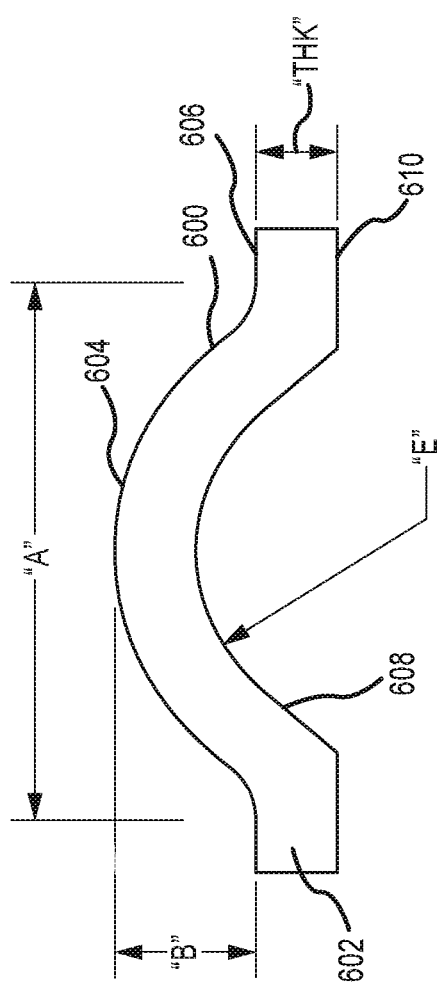
FIG. 6 depicts a diagram of the geometry of a rib on a plate according to embodiments.

FIG. 6 depicts a profile of an embodiment of a rib 600 protruding from a plate 602. Rib 600 may be used as any of the ribs 112, 204, 404, 514, and/or 522 of the various bushings and tip plates described herein. Plate 602 may be a bushing or tip plate as described herein. Rib 600 is configured to increase the moment of inertia (MOI) of plate 602 to increase the stiffness. The increased stiffness enhances the resistance to creep strain of plate 602. In some embodiments, rib 600 has an arcuate surface 604 projecting beyond a first surface 606 of the plate 602 and a corresponding arcuate indentation 608 on an opposite second surface 610 of the plate 602. In some embodiments, the first surface 606 may be a top surface of the plate 602, while in other embodiments the first surface may be a bottom surface of the plate 602. Rib 600 may protrude a height B beyond first surface 606, and may have a width A. In some embodiments, height B may be between about 0.040 inches and 0.070. Width A may be between about 0.20 inches and 0.30 inches. Rib 600 may have a thickness THK of between about 0.040 inches and 0.070 inches. The arcuate indentation 608 may have a radius E of between about 0.030 inches and 0.060 inches. Such ranges of rib dimensions are based on the described plate/rib thickness THK as well as an expected load type/amount. Dimensions outside of these ranges may be possible, but may result in a diminished efficiency of reducing creep. Additionally, other dimensions may be used to match necessary plate thicknesses and/or loads for a particular application. Sufficient creep resistance may be achieved when radius E is at least twice as large as thickness THK. In some embodiments, longer ribs result in greater creep resistance. Components of bushing systems, such as bushing system 500, requiring the most rigidity and/or creep resistance may include ribs 600.

Figure 7:
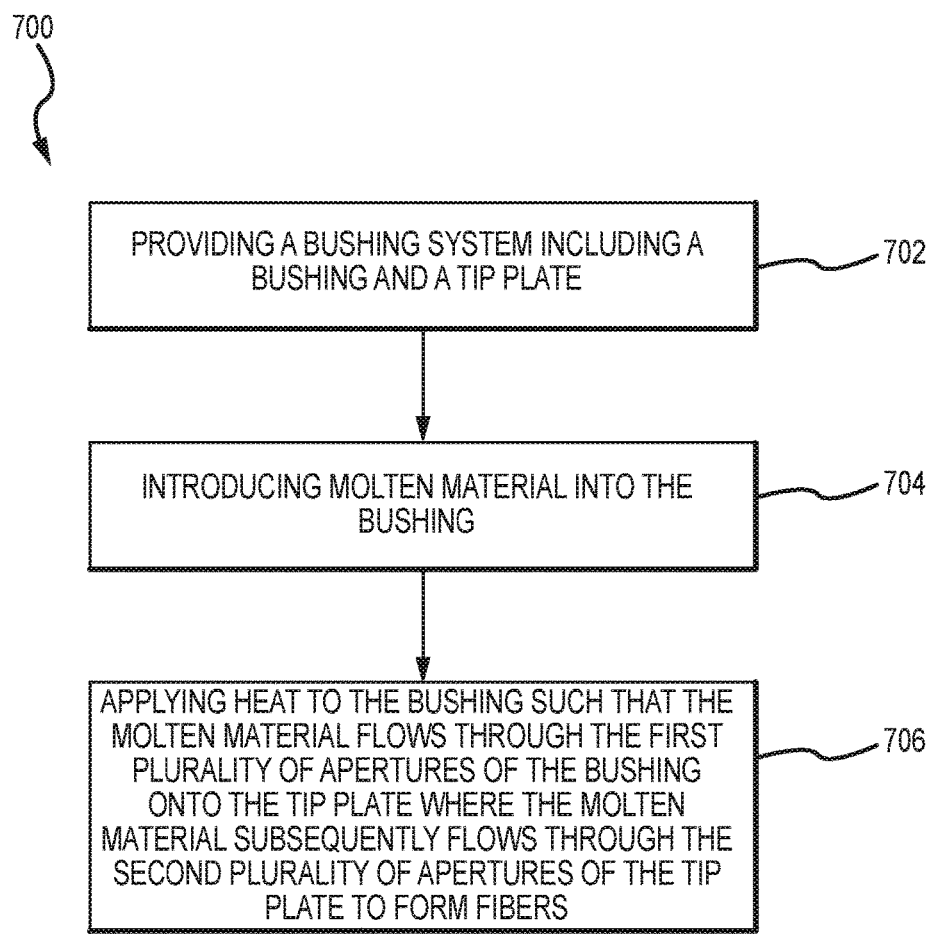
FIG. 7 is a flowchart illustrating a method for producing fibers from a molten material according to embodiments.

FIG. 7 depicts a flowchart of a method 700 for producing fibers from a molten material using a bushing system as described herein, such as bushing system 500. The method 700 may include providing a bushing system having a bushing that is configured to receive a molten material at block 702. In some embodiments, the molten material may be glass, such as E-type glass. The bushing may have a plate defining a first plurality of apertures through which the molten material flows. The plate may include a longitudinal axis, as well as a first side wall and a second side wall disposed on a side of the plate opposite the first side wall. The first side wall and the second side wall may extend at an upward angle from the plate. The plate may further include a plurality of ribs extending along at least a portion of the plate. The bushing system may also include a tip plate coupleable with the bushing. The tip plate may be configured to receive the molten material from the bushing and may define a second plurality of apertures through which the molten material flows to form fibers. The tip plate may include tips or nozzles that are formed or inserted within the apertures. These tips may determine the final diameter of the fibers. In embodiments without tips, the fiberizing may occur through the apertures in the tip plate, which then may set the diameter of the final fibers. In some embodiments, the tip plate may include one or more ribs extending along a portion of the tip plate. The ribs on the bushing plate and/or the tip plate may include a ceramic material lining. For example, the ribs may be lined with an alumina-based ceramic, such as one containing a major portion of alumina and minor parts of yttria and magnesium oxide. In some embodiments, the ribs may extend entirely to an edge of the bushing plate and/or the tip plate. The method may also include introducing the molten material to the bushing at block 704. Heat may be applied to the bushing such that the molten material flows through the first plurality of apertures of the bushing onto the tip plate where the molten material subsequently flows through the second plurality of apertures of the tip plate to form fibers at block 706. The method may also include attenuating the flowing molten material and solidifying the attenuated molten material to form the fibers. In some embodiments, the flowing molten material may be attenuated by receiving the molten material on a high speed winder that winds and pulls to apply stress to the molten material to form fibers having the desired diameters.

Embodiments of the invention have now been described in detail for the purposes of clarity and understanding. However, it will be appreciated that certain changes and modifications may be practiced within the scope of the appended claims.

What is claimed is:

1. A bushing system for producing fibers from a molten material, the bushing system comprising:
   a bushing that is configured to receive a molten material, the bushing comprising:
      a plate that is configured to receive the molten material, the plate defining a first plurality of apertures through which the molten material flows, the plate having a longitudinal axis;
      a first side wall disposed on a first side of the plate along the longitudinal axis;
      a second side wall disposed on a second side of the plate opposite the first side wall, wherein:
         the first side wall and the second side wall extend at an upward angle from the plate;
         the first side wall and the second side wall are positioned along the longitudinal axis;
         the plate further comprises a first plurality of ribs extending along at least a portion of the plate; and
         each of the first plurality of ribs is positioned between two at least substantially coplanar portions of the plate;
      a first side rail extending downward from the first side wall, wherein the first side rail comprises a plurality of embossed portions extending along a length of the first side rail; and
      a second side rail extending downward from the second side wall, wherein the second side rail comprises a plurality of embossed portions extending along a length of the second side rail; and
   a tip plate coupleable with the bushing such that the tip plate is disposed a distance below the plate, the tip plate being configured to receive the molten material from the bushing and defining a second plurality of apertures through which the molten material flows to form fibers, wherein the tip plate comprises a second plurality of ribs extending along at least a portion of the tip plate.

2. The bushing system for producing fibers from a molten material according to claim 1, further comprising:
   a first wing extending between the first side rail and the first side wall, the first wing being in generally parallel alignment with the plate; and
   a second wing extending between the second side rail and the second side wall, the second wing being in generally parallel alignment with the plate.

3. The bushing system for producing fibers from a molten material according to claim 2, further comprising:
   a sealing flange configured to be coupled between a source of the molten material and each of the first wing and the second wing such that the molten material received in the bushing does not leak out of the bushing.

4. The bushing system for producing fibers from a molten material according to claim 3, wherein:
   the sealing flange is configured to extend around an entire outer periphery of the bushing and is in generally parallel alignment with the plate.

5. The bushing system for producing fibers from a molten material according to claim 1, further comprising:
   a terminal end coupled with one or both of an end of the bushing and an end of the tip plate, wherein the terminal end is configured to be coupled with an electrical source that supplies electric current to heat the bushing and the tip plate.

6. The bushing system for producing fibers from a molten material according to claim 1, wherein:
   each of the first plurality of ribs comprises an arcuate surface projecting beyond a first surface of the plate and a corresponding arcuate indentation on an opposite second surface of the plate.

7. The bushing system for producing fibers from a molten material according to claim 1, further comprising:
   a third plurality of ribs extending along each of the first side wall and the second side wall.

8. A bushing system for producing fibers from a molten material, the bushing system comprising:
   a bushing that is configured to receive a molten material, the bushing comprising:
      a plate defining a first plurality of apertures through which the molten material flows, the plate having a longitudinal axis;
      a first side wall disposed on a first side of the plate along the longitudinal axis;
      a second side wall disposed on a second side of the plate opposite the first side wall;
      a first wing extending outward from the first side wall, the first wing being in generally parallel alignment with the plate;
      a second wing extending outward from the first side wall, the first wing being in generally parallel alignment with the plate;
      a first side rail extending downward from an outer edge of the first wing; and
      a second side rail extending downward from an outer edge of the second wing, wherein:
         the first side wall and the second side wall extend at an upward angle from the plate; and
         the plate further comprises a first plurality of ribs extending along at least a portion of the plate; and
   a tip plate coupleable with the bushing such that the tip plate is disposed at a distance below the plate, the tip plate being configured to receive the molten material from the bushing and defining a second plurality of apertures through which the molten material flows to form fibers, wherein the tip plate comprises a second plurality of ribs extending along at least a portion of the tip plate.

9. The bushing system for producing fibers from a molten material according to claim 8, wherein:
   the distance is between about 0.02 and 0.08 inches.

10. The bushing system for producing fibers from a molten material according to claim 8, further comprising:
    a terminal end coupled with one or both of an end of the bushing and an end of the tip plate, wherein the terminal end is configured to be coupled with an electrical source that supplies electric current to heat the bushing and the tip plate.

11. The bushing system for producing fibers from a molten material according to claim 8, further comprising:
a plurality of tips configured to be inserted within each of the second plurality of apertures such that a top portion of each tip contacts a top surface of the tip plate and a lower portion that extends beyond a bottom surface of the tip plate, wherein each tip defines a tip aperture through which the molten material passes to form fibers below a surface of the tip plate.

12. The bushing system for producing fibers from a molten material according to claim 8, further comprising:
a sealing flange configured to be coupled between a source of the molten material and each of the first wing and the second wing such that the molten material received in the bushing does not leak out of the bushing.

13. The bushing system for producing fibers from a molten material according to claim 12, wherein:
the sealing flange is configured to extend around an entire outer periphery of the bushing and is in generally parallel alignment with the plate.

14. The bushing system for producing fibers from a molten material according to claim 8, wherein:
the first plurality of ribs are disposed in a honeycomb pattern along the plate.

* * * * *